S. HORSLEY.
LAMP.
APPLICATION FILED OCT. 19, 1916.
1,312,731.
Patented Aug. 12, 1919.
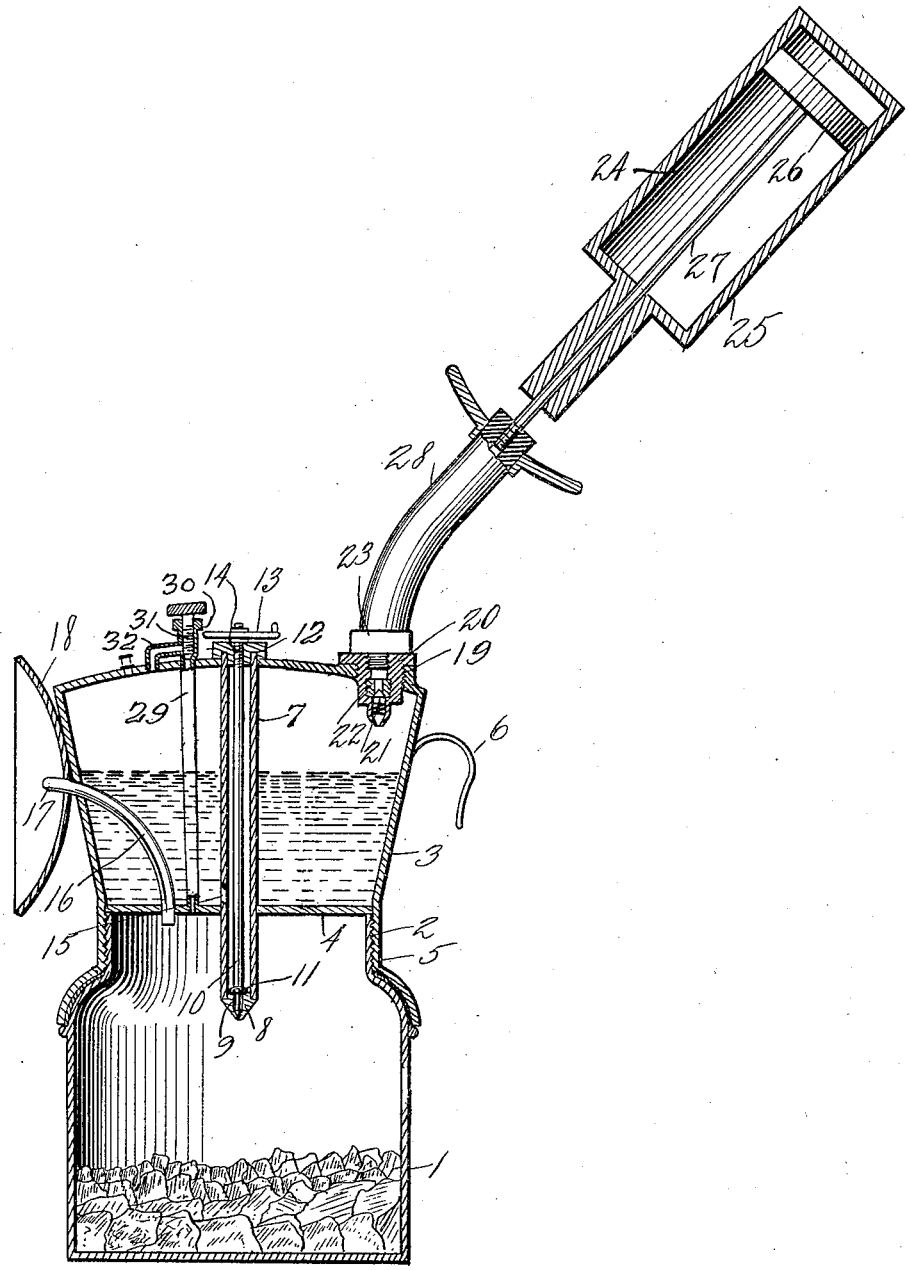
INVENTOR
Sherman Horsley.
BY Richard Bowen
ATTORNEY

UNITED STATES PATENT OFFICE.

SHERMAN HORSLEY, OF RICHMOND, MISSOURI.

LAMP.

1,312,731. Specification of Letters Patent. Patented Aug. 12, 1919.

Application filed October 19, 1916. Serial No. 126,607.

*To all whom it may concern:*

Be it known that I, SHERMAN HORSLEY, a citizen of the United States, residing at Richmond, in the county of Ray and State of Missouri, have invented certain new and useful Improvements in Lamps, of which the following is a specification.

This invention has relation to miners' lamps employing gaseous fuel, and of that type wherein the fuel is generated by chemical reaction of water and a substance which evolves the gas when moistened, and has for an object to provide in a lamp of this type means whereby the water may be fed to the chamber containing the gas evolving substance, in a positive manner, and at a predetermined rate of flow with means for varying the rate of flow.

Another object of the invention is to provide a lamp having the above named characteristics, and embodying means whereby the flow of water may be automatically retarded or shut off when the evolution of gas is too rapid and the pressure within the gas chamber exceeds a predetermined limit.

Another object of the invention is to provide means for utilizing the pressure induced by the generation of gas to forcibly feed the water to the substance.

In addition to the foregoing my invention comprehends improvements in the details of construction and arrangement of parts to be hereinafter more fully described and particularly pointed out in the appended claims.

In the accompanying drawings in which similar and corresponding parts are designated by the same characters of reference throughout the several views in which they appear, I have illustrated a lamp adapted to be secured to a miner's cap and embodying my improvements.

With reference to the drawings 1 indicates the base of the lamp which is substantially cylindrical and hollow, and is open at its upper portion and externally threaded as at 2. The base portion, after the usual manner, is designed to serve as the container for the gas producing chemical, and to constitute the gas supply chamber.

A superstructure is provided for the base portion of the lamp, comprising a substantially inverted frusto-conical water container 3 provided with a bottom 4, and having its side extended downwardly beyond the bottom as at 5 and internally threaded to engage the externally threaded portion 2 of the base portion of the lamp. A hook member 6 is provided at one side of the upper container whereby the lamp may be secured to a miner's cap.

The water container 3 is provided with a central vertical tube 7 which extends below the bottom portion 4 of the container, and is reduced as at 8 and formed with a narrow aperture 9, a valve stem 10 is provided interiorly of the tube and is adapted to be seated in the reduced opening 9, and is formed with an annular member 11 which rests upon the shoulder formed by reducing the lower end of the tube, thereby forming when the parts are in contact a water tight joint. The upper end of the valve stem 10 extends through a packing 12 formed with the top of the water container, and an operating wheel 13 is secured to that portion of the valve stem which projects beyond the packing. The valve stem or rod is threaded as at 14, for engagement in a correspondingly threaded portion of the packing gland, whereby upon rotating the wheel the lower end of the valve stem is reciprocated vertically in the reduced opening 9 thereby permitting the flow of water from the water tank through a lateral opening 15 provided in the side of the tube, and through the reduced opening 9 into the base portion of the lamp. An arcuate tube 16 is located interiorly of the water chamber, with the lower end projecting through the bottom 4 thereof, in communication with the interior of the gas chamber 1, its opposite end projecting through the sides of the water container, and provided with a burner 17 which projects centrally through a reflector 18 secured to the sides of the water chamber.

The top of the water container is provided with an internally threaded opening 19 adapted to receive a valve casing 20 in threaded engagement, said valve casing being provided with a spring pressed valve 21 which is held against a removable valve seat 22 located in the valve casing. The valve casing projects interiorly of the water chamber, and the upper end is formed with an internally threaded opening adapted to receive a correspondingly threaded cap 23 of a manually operable hand pump designated generally at 24. This pump comprises a cylinder 25 having therein a reciprocable piston 26 forming a part of a tubular piston rod 27 which is provided at its projecting end with a flexible connection 28, having at its opposite end the threaded cap 23.

Obviously, by reciprocating the cylinder 25, the automatic operation of the valve 21 permits the accumulation of air pressure in the water chamber 2 above the water level thereof, and when the pressure has reached a predetermined limit, the pump may be readily detached from the lamp. A few atmospheres of pressure are sufficient, and the water in the water chamber is thus forced through the tubular member 7, past the valve stem 10 and dropped upon the gas evolving substance within the base portion of the lamp. The rate of flow can be regulated by rotating the wheel 13 of the valve stem to vary the extent of the opening to passage 9. In any event, the pressure within the water chamber serves to insure a continuous flow, and the deposit of by products of the reaction around the lower end of the tube 7 will not interfere in any manner with the flow of water, which is a disadvantage of lamps of this type heretofore provided having a gravity water feed.

A vertical tube 29 is provided interiorly of the water chamber, with its lower end secured in the bottom floor thereof and in communication with the gas chamber, while its upper end is enlarged as at 30 to receive a valve 31 which controls communication between the gas chamber and upper portion of the water chamber through the medium of a branch tube 32 formed in the side of the enlarged portion 30. This arrangement permits the forcible feed of water to the gas chamber by utilizing the pressure of gas in lieu of air pressure introduced into the water chamber as set forth above. Thus during the initial operation of the lamp, sufficient water is permitted to flow into the gas chamber to generate pressure, which pressure is also permitted to accumulate in the water chamber by opening the valve 31. When the pressure in the two chambers are presumed to be equalized, the valve 31 is closed, whereupon the gas pressure in the water chamber is trapped therein, and when the pressure in the lower chamber is reduced owing to the escape through the burner, the excess pressure thereover in the water chamber serves to forcibly eject the water therefrom.

While I have illustrated and described my invention with some degree of particularity, I nevertheless realize that in practice various alterations thereover may be made, and I therefore reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:—

1. A miner's lamp including in combination, a gas and chemical chamber, a water chamber superposed thereupon, a valve controlling communication therebetween to permit flow of water to the gas chamber by gravity, a tube in communication at one end with the gas chamber, and at its opposite end with the atmosphere, the latter end being internally threaded, said tube however, extending through the water chamber, a branch located exteriorly of the water chamber leading from said terminal of the tube back into the water chamber, and a screw entering said tube to lap the end of the branch to form a valve for cutting off communication between said tube and the atmosphere, and the tube and its branch.

2. A miner's lamp including in combination, a gas and chemical chamber, a water chamber superposed thereon, a valve controlling communication therebetween to permit flow of water to the gas chamber by gravity, a tube in communication at one end with the gas chamber, and at its opposite end with the atmosphere, the latter end being internally threaded, said tube, however, extending through the water chamber, a branch located exteriorly of the water chamber leading from said terminal of the tube back into the water chamber, a screw entering said tube to lap the end of the branch to form a valve for cutting off communication between said tube and the atmosphere, and the tube and its branch, a tube leading from the gas chamber to the exterior of the lamp, a burner at the outer end of the last-mentioned tube, and means on the lamp for securing the same to a miner's cap.

In testimony whereof I affix my signature in presence of two witnesses.

SHERMAN HORSLEY.

Witnesses:
  MILLER H. HAUSER,
  FRANK D. GARNER.

Copies of this patent may be obtained for five cents each, by addressing the "Commissioner of Patents, Washington, D. C."